United States Patent
Matsumoto et al.

(10) Patent No.: US 7,514,381 B2
(45) Date of Patent: Apr. 7, 2009

(54) OPTICAL GLASS AND LENS

(75) Inventors: Syuji Matsumoto, Yokohama (JP); Jun Sasai, Yokohama (JP); Naoki Sugimoto, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 108 days.

(21) Appl. No.: 11/616,179

(22) Filed: Dec. 26, 2006

(65) Prior Publication Data

US 2007/0105702 A1    May 10, 2007

Related U.S. Application Data

(63) Continuation of application No. PCT/JP2005/011558, filed on Jun. 23, 2005.

(30) Foreign Application Priority Data

Jun. 24, 2004 (JP) .............................. 2004-186226
Aug. 10, 2004 (JP) .............................. 2004-233408

(51) Int. Cl.
C03C 3/15    (2006.01)
C03C 3/155   (2006.01)
C03C 3/14    (2006.01)
C03C 3/12    (2006.01)

(52) U.S. Cl. ............................. 501/50; 501/41; 501/49; 501/51

(58) Field of Classification Search ............... 501/41, 501/42, 49, 50, 51
See application file for complete search history.

(56) References Cited

U.S. PATENT DOCUMENTS

| | | | |
|---|---|---|---|
| 4,732,875 A * | 3/1988 | Sagara | 501/42 |
| 5,245,492 A * | 9/1993 | Mizuno et al. | 360/125.01 |
| 7,033,966 B2 | 4/2006 | Kobayashi et al. | |
| 7,098,158 B2 * | 8/2006 | Natsugari et al. | 501/78 |
| 2003/0191006 A1 * | 10/2003 | Natsugari et al. | 501/49 |
| 2004/0235634 A1 * | 11/2004 | Kobayashi et al. | 501/41 |
| 2007/0105702 A1 | 5/2007 | Matsumoto et al. | |

FOREIGN PATENT DOCUMENTS

| | | | |
|---|---|---|---|
| JP | 61-197443 A | | 9/1986 |
| JP | 2004-43294 A | | 2/2004 |
| JP | 2006182577 A | * | 7/2006 |

OTHER PUBLICATIONS

Derwent Abstract 2006-475424, English Abstract of JP 2006-182577A, Jul. 13, 2006.*
U.S. Appl. No. 11/947,976, filed Nov. 30, 2007, Sasai et al.

* cited by examiner

*Primary Examiner*—Karl E Group
*Assistant Examiner*—Elizabeth A Bolden
(74) *Attorney, Agent, or Firm*—Oblon, Spivak, McClelland, Maier & Neustadt, P.C.

(57) ABSTRACT

To provide an optical glass which has a high transmittance and a high refractive index and shows little decrease in the transmitted light intensity when continuously irradiated with a blue-violet laser diode light, and which is less prone to a higher melting temperature and exhibits chemical durability being not low. An optical glass consisting essentially of, as represented by mol %, from 35 to 54% of $TeO_2$, from 0 to 10% of $GeO_2$, from 5 to 30% of $B_2O_3$, from 0 to 15% of $Ga_2O_3$, from 0 to 8% of $Bi_2O_3$, from 3 to 20% of ZnO, from 0 to 10% of MgO+CaO+SrO+BaO, from 1 to 10% of $Y_2O_3+La_2O_3+Gd_2O_3$, from 0 to 5% of $Ta_2O_5+Nb_2O_5$, from 0 to 1.8% of $TiO_2$, and from 0 to 6% of $Li_2O+Na_2O+K_2O+Rb_2O+Cs_2O$. A lens made of such an optical glass.

12 Claims, No Drawings

OPTICAL GLASS AND LENS

TECHNICAL FIELD

The present invention relates to an optical glass and a lens suitable as an object lens to be used for writing on or reading out from an optical recording medium such as CD, CD-R, CD-RW, DVD or MO or as a collimate lens for a laser.

BACKGROUND ART

Writing on the optical recording medium or reading out from such a medium is carried out by converting a laser beam by a collimate lens to a parallel light, which is then focused by an object lens. Such collimate lens and object lens are produced usually by heating a preform made of glass or a resin to its softening point, followed by precision pressing.

In recent years it has been proposed to utilize a violet laser beam having a wavelength of from 400 to 415 nm (typical wavelength being 405 nm) in order to increase the recording density of an optical recording medium, and an optical glass or lens suitable for such a proposal is disclosed (see Patent Document 1).

Patent Document 1: JP-A-2004-43294

DISCLOSURE OF THE INVENTION

Problems to be Solved by the Invention

Patent Document 1 discloses an optical glass which has a high transmittance and a high refractive index and shows little decrease in the transmitted light intensity when continuously irradiated with a violet laser diode light with a wavelength of 405 nm.

However, with respect to such an optical glass, one which satisfies the level presently required for each of such properties, has had a problem such that the melting temperature is high, whereby melting in a large scale by means of a gold crucible tends to be difficult, or it is inferior in the chemical durability such as water resistance or weather resistance.

It is an object of the present invention to provide an optical glass and a lens capable of solving such a problem.

Means to Solve the Problem

The present invention is to accomplish the above object and provides the following.

(1) An optical glass consisting essentially of, as represented by mol % based on the following oxides, from 35 to 54% of $TeO_2$, from 0 to 10% of $GeO_2$, from 5 to 30% of $B_2O_3$, from 0 to 15% of $Ga_2O_3$, from 0 to 8% of $Bi_2O_3$, from 3 to 20% of ZnO, from 0 to 10% of MgO+CaO+SrO+BaO, from 1 to 10% of $Y_2O_3+La_2O_3+Gd_2O_3$, from 0 to 5% of $Ta_2O_5+Nb_2O_5$, from 0 to 1.8% of $TiO_2$, and from 0 to 6% of $Li_2O+Na_2O+K_2O+Rb_2O+Cs_2O$ (2) The optical glass according to the above (1), wherein $TeO_2+GeO_2$ is from 40 to 60%.

(3) The optical glass according to the above (1) or (2), which contains $TiO_2$.

(4) The optical glass according to any one of the above (1) to (3), which contains $Bi_2O_3$.

(5) The optical glass according to any one of the above (1) to (4), wherein $B_2O_3+Ga_2O_3+Bi_2O_3$ is from 15 to 35%.

(6) The optical glass according to any one of the above (1) to (5), wherein ZnO+MgO+CaO+SrO+BaO is from 5 to 30%.

(7) The optical glass according to any one of the above (1) to (6), which has an internal transmittance in a thickness of 1 mm to a light with a wavelength of 405 nm being at least 90% and a refractive index to the same light being at least 1.92.

(8) The optical glass according to any one of the above (1) to (7), which, when irradiated with a light with a wavelength of 405 nm under such a condition that the energy density is 6 $kW/m^2$, shows a decrease L of not more than 16% in the intensity of light transmitted in a thickness of 1 mm in 24 hours after the irradiation.

(9) The optical glass according to any one of the above (1) to (8), which can be melted at a temperature of not higher than 980° C.

(10) A lens made of an optical glass as defined in any one of the above (1) to (9).

Effects of the Invention

The optical glass of the present invention (hereinafter referred to simply as the glass of the present invention) has a small ZnO content, whereby the melting temperature can be made low, and stabilized melting in a large scale will be possible. Further, even in a case where alkali metal oxides are contained, the total content thereof is not more than 6%, whereby the above-mentioned worry about the chemical durability can be reduced.

Further, when the lens of the present invention is used for the above-mentioned collimate lens and the object lens, it will be possible to interchangeably utilize the violet laser beam and the near infrared laser beam which has been used heretofore.

Further, in its preferred embodiment, it is possible to substantially suppress the decrease in the above-mentioned transmitted light intensity as compared with the optical glass disclosed in Patent Document 1, while the transmittance and the refractive index are kept at high levels.

BEST MODE FOR CARRYING OUT THE INVENTION

The lens of the present invention can be produced, for example, by press molding the glass of the present invention. Namely, the glass of the present invention is processed to obtain a preform, and then, this preform is heated and softened, and then subjected to press molding (so-called precision pressing) by means of a mold to obtain a lens. Here, the preform may be prepared by directly molding the glass of the present invention in a molten state.

The glass of the present invention is preferably one which can be prepared by melting at a temperature of at most 980° C. Otherwise, it becomes difficult to melt the glass by means of a gold crucible (melting point: 1,063° C.), and it will be necessary to melt it by means of a platinum or platinum alloy crucible, whereby platinum will be dissolved in the glass, and the transmittance of the glass tends to deteriorate.

The glass of the present invention preferably has an internal transmittance to a light with a wavelength of 405 nm being at least 90% as a value (T) calculated in a thickness of 1 mm. If it is less than 90%, it tends to be difficult to use it as a lens as mentioned above. It is more preferably at least 92%, particularly preferably at least 94%.

The above-mentioned T may be measured, for example, as follows.

With respect to two plate-shape samples having a size of 2 cm×2 cm and thicknesses of 1 mm and 5 mm with both surfaces mirror-polished, the transmittances to a light with a wavelength of 405 nm are measured by means of a spectrophotometer U-3500 (trade name) manufactured by Hitachi, Ltd. The transmittances of the plate-shape samples having thicknesses of 1 mm and 5 mm, obtained by the measurements, are represented by $T_1$ and $T_5$, respectively, and T (unit: %) is calculated by the following formula.

$$T=100\times\exp[(2/3)\times\log_e(T_5/T_1)]$$

The glass of the present invention preferably has a refractive index (n) of at least 1.92 to a light with a wavelength of 405 nm. If the refractive index is less than 1.92, it tends to be difficult to obtain an object lens having a thinness (a typical thickness being from 1.5 to 3.5 mm) applicable to writing on an optical recording medium and having a desired numerical aperture (typically from 0.65 to 0.85). It is more preferably at least 1.94, particularly preferably at least 1.97, most preferably at least 1.99. Further, n is typically at most 2.1.

The glass of the present invention is preferably such that when it is irradiated with a light of violet laser diode (wavelength: 405 nm) under such a condition that the energy density is 6 kW/m$^2$, the decrease L in the intensity of light transmitted in a thickness of 1 mm in 24 hours after the irradiation, is not more than 16%. If the decrease L exceeds 16%, even if T were 97% before the initiation of irradiation, T would decrease to less than 80% upon expiration of 24 hours after the irradiation, whereby it tends to be difficult to use such a lens of the present invention as an object lens for DVD which employs a violet laser diode light.

In a case where it is desired to bring T to be at least 90% upon expiration of 24 hours after the irradiation even if T were 95% before the initiation of irradiation, L is more preferably at most 5%. Further, in a case where it is desired to bring T to be at least 90% upon expiration of 24 hours after irradiation even if T were 93% before the initiation of irradiation, L is more preferably at most 3%.

L may be measured, for example, as follows. Namely, a plate-shape sample having a size of 1 cm×1 cm and a thickness of 1 mm with both surfaces mirror-polished, is irradiated with a violet light (wavelength: 405 nm) of a violet laser diode NDHV310APC (trade name), manufacture by Nichia Corporation under a condition of 6 kW/m$^2$ for 24 hours, and the transmitted light intensity $I_0$ immediately after initiation of irradiation and the transmitted light intensity $I_1$ after irradiation for one hour are measured by means of photodiode PD-300UV (trade name), manufactured by Ophir Company, and L (unit: %) is calculated by the following formula:

$$L=(I_0-I_1)\times100/I_0$$

Now, the composition of the glass of the present invention will be described, wherein mol % will simply be represented by %.

$TeO_2$ is a component to form a glass skeleton and to increase n and thus is essential. If it is less than 35%, vitrification tends to be difficult or n tends to be low. It is preferably at least 40%, more preferably at least 44%. If it exceeds 54%, L tends to be large. It is preferably at most 52%, typically at most 48%.

$GeO_2$ is not essential, but is a component to form a glass skeleton, to increase T, to stabilize the glass, or to suppress devitrification during the molding, and may be incorporated up to 10%. If it exceeds 10%, the glass transition point ($T_G$) tends to be high, the press molding temperature also tends to be high, and the life of the mold is likely to be short, or it is likely to be difficult to melt the glass at a temperature of at most 980° C. In a case where it is desired to lower the melting temperature, $GeO_2$ is preferably at most 8%, typically at most 6%. In a case where $GeO_2$ is incorporated, its content is preferably at most 2%.

The total of contents of $TeO_2$ and $GeO_2$ i.e. $TeO_2+GeO_2$, is preferably from 40 to 60%. If the total content is less than 40%, vitrification is likely to be difficult. It is more preferably at least 45%, particularly preferably at least 47%. If it exceeds 60%, L is likely to be large. It is more preferably at most 55%, particularly preferably at most 53%.

$B_2O_3$ is a component to form a glass skeleton as is essential. If it is less than 5%, the glass tends to be unstable. It is preferably at least 10%, more preferably at least 15%. If it exceeds 30%, n tends to be low, or the chemical durability such as water resistance tends to deteriorate. Typically, it is at most 20%.

$Ga_2O_3$ is not essential, but may be incorporated up to 15% in order to increase n or to increase the hardness. If it exceeds 15%, the glass is likely to be unstable. It is preferably at most 10%, typically at most 8%. In a case where $Ga_2O_3$ is incorporated, its content is preferably at least 4%.

$Bi_2O_3$ is not essential, but may be incorporated up to 8% in order to increase n. If it exceeds 8%, T tends to be low.

For example, in a case where it is desired to bring n to be at least 1.98, $Bi_2O_3$ is preferably incorporated in an amount of at least 1%. It is more preferably at least 2%.

$B_2O_3+Ga_2O_3+Bi_2O_3$ is preferably from 15 to 35%. If the total amount is less than 15%, vitrification is likely to be difficult. More preferably it is at least 20% and at most 30%. If it exceeds 35%, the glass is likely to be unstable.

ZnO is a component to stabilize the glass and is essential. If it is less than 3%, the glass is likely to be unstable. It is preferably at least 10%. If it exceeds 20%, the melting temperature cannot be made low. It is preferably at most 19%.

Any one of MgO, CaO, SrO and BaO is not essential, but they may be incorporated in a total amount of 10%, for example, in a case where it is desired to stabilize the glass. If the total amount exceeds 10%, vitrification is likely to be difficult, the molding temperature tends to be high, or $T_G$ tends to be high. It is preferably at most 5%.

ZnO+MgO+CaO+SrO+BaO is preferably from 5 to 30%, more preferably from 10 to 25%.

$Y_2O_3$, $La_2O_3$ and $Gd_2O_3$ are components to suppress devitrification during the molding, and at least one of them must be contained. If the total of contents of these three components is less than 1%, devitrification is likely to occur during the molding. The total content is preferably at least 2%. If it exceeds 10%, vitrification tends to be difficult, or the melting temperature tends to be high. It is preferably at most 8%.

In a case where $Y_2O_3$ or $La_2O_3$ is incorporated, the content is preferably at most 3%. If it exceeds 3%, n is likely to be low. Typically, it is at most 1%.

In a case where it is desired to further increase n, it is preferred that $Gd_2O_3$ is incorporated in an amount of from 1 to 5%.

Each of $Ta_2O_5$ and $Nb_2O_5$ is not essential, but may be incorporated in a total amount of 5% in order to increase n. If the total amount exceeds 5%, devitrification is likely to take place during the molding. It is preferably at most 4%.

In a case where it is desired to increase n and T, it is preferred that $Ta_2O_5$ is incorporated in an amount of at least 1%.

$TiO_2$ is not essential, but may be incorporated in an amount of up to 1.8% in order to increase n or to reduce L. If it exceeds 1.8%, T tends to be low. It is preferably at most 1.5%. In a case where it is desired to reduce L, it is preferred that $TiO_2$ is at least 0.3%.

Each of $Li_2O$, $Na_2O$, $K_2O$, $Rb_2O$ and $Cs_2O$ is not essential, but they may be incorporated in a total amount of up to 6% in order to lower $T_G$ or the melting temperature. If the total amount exceeds 6%, the chemical durability tends to deteriorate. It is preferably at most 5%. In a case where it is desired to further increase the chemical durability, the above total amount is preferably less than 1%, and it is particularly preferred that no alkali metal oxide is contained.

In a case where it is desired to bring L to be at most 9%, it is preferred that $GeO_2$ is made to be at least 3.5% and $Bi_2O_3$ is made to be from 0 to 2.5%, or $TiO_2$ is made to be from 0.3 to 1.8%.

The glass of the present invention consists essentially of the above components, but it may contain other components within a range not to impair the purpose of the present invention. In a case where such other components are incorporated, the total of contents of such other components is preferably at most 10%, more preferably at most 5%.

Further, the glass of the present invention preferably does not contain any one of PbO, $As_2O_3$, $Sb_2O_3$ and CdO, and it is also preferred that glass materials of high purity are used, and the $Fe_2O_3$ content is made to be at most 0.0001%, as represented by the mass percentage.

EXAMPLES

With respect to Examples 1 to 14, raw materials were blended to obtain a composition as shown by mol % in the columns for from $TeO_2$ to $Na_2O$ in the Table, to prepare 450 g of a blend material, and this blend material was put into a gold crucible having a capacity of 300 cc and melted at 950° C. for 2.5 hours. At that time, the molten glass was stirred for one hour by a gold stirrer and homogenized. The homogenized molten glass was cast into a carbon mold and formed into a plate-shape, followed by annealing.

With respect to Example 15, the molten glass was formed into a plate-shape in the same manner as in Examples 1 to 14, but devitrification was remarkable. Therefore, it was melted as follows. Namely, 100 g of a blend material was prepared, put into a gold crucible having a capacity of 100 cc and melted at 995° C. for one hour. At that time, no stirring by means of a gold stirrer was carried out, since the melting temperature was close to the melting point of gold, and it was likely that the shape could not be maintained. Such insufficiently homogenized molten glass obtained was cast to form into a plate-shape, followed by annealing.

Examples 1 to 13 are Working Example of the present invention, and Examples 14 and 15 are Comparative Examples.

As the raw materials, tellurium dioxide having a purity of at least 99.999%, manufactured by Shinko Chemical Co., Ltd., guaranteed reagents of boron oxide and titanium oxide, manufactured by KANTO CHEMICAL CO., INC., lanthanum oxide, yttrium oxide and gadolinium oxide, having a purity of 99.9%, manufactured by Shin-Etsu Chemical Co., Ltd., guaranteed reagents of gallium oxide, manufactured by Rare Metallic Co., Ltd., zinc oxide having a purity of at least 99.999%, manufactured by Kojundo Chemical Laboratory Co., Ltd., germanium oxide having a purity of at least 99.995%, manufactured by the same company, and tantalum oxide having a purity of at least 99.9%, manufactured by the same company, were used.

With respect to the obtained glasses, $T_G$ (unit: ° C.), T (unit: %), n, L (unit: %), and the refractive index $n_d$ and the Abbe number $v_d$ by d-line, were measured. The methods for measuring $T_G$, n, $n_d$ and $v_d$ will be described below.

$T_G$: 150 mg of a sample processed into a powder form was filled in a platinum pan, and $T_G$ was measured by a thermal analyzer TG/DTA6300 (trade name), manufactured by Seiko Instruments Inc.

n, $n_d$ and $v_d$: A glass was processed into a triangular prism having a thickness of 10 mm and each side being 30 mm, and n, $n_d$ and $v_d$ were measured by a precision spectrometer GMR-1 (trade name), manufactured by Kalnew Optical Industrial Co., Ltd. Here, in Example 15, none of n, $n_d$ and $v_d$ was measured, but with respect to n, a value assumed, on the basis of the composition, from the refractive index (=1.92) to a light with a wavelength of 633 nm, is shown.

Further, with respect to Examples 1, 10, 13 and 15, water resistance RW and acid resistance RA were evaluated as follows in accordance with the evaluation method prescribed by Japan Optical Glass Industry Association. The grades are indicated in the corresponding spaces in the Table.

RW: With respect to a glass particle having a diameter of from 420 to 600 μm, the decrease in mass (%) was measured when it was immersed in 80 ml of pure water at 100° C. for one hour. The decrease in mass being less than 0.05(%) was rated as grade 1, the decrease in mass being at least 0.05 and less than 0.10(%) was rated as grade 2, the decrease in mass being at least 0.10 and less than 0.25(%) was rated as grade 3, the decrease in mass being at least 0.25 and less than 0.60(%) was rated as grade 4, the decrease in mass being at least 0.60 and less than 1.10(%) was rated as grade 5, and the decrease in mass being at least 1.10 (%) was rated as grade 6.

RA: With respect to a glass particle having a diameter of from 420 to 600 μm, the decrease in mass (%) was measured when it was immersed in 80 ml of a 0.01 N nitric acid aqueous solution at 100° C. for one hour. The decrease in mass being less than 0.20(%) was rated as grade 1, the decrease in mass being at least 0.20 and less than 0.35(%) was rated as grade 2, the decrease in mass being at least 0.35 and less than 0.65(%) was rated as grade 3, the decrease in mass being at least 0.65 and less than 1.20(%) was rated as grade 4, and the decrease in mass being at least 1.20 and less than 2.20(%) was rated as grade 5 and the decrease in mass being at least 2.20(%) was rated as grade 6.

TABLE 1

|  | 1 | 2 | 3 | 4 | 5 | 6 | 7 |
|---|---|---|---|---|---|---|---|
| $TeO_2$ | 51.0 | 51.0 | 47.0 | 46.8 | 46.0 | 45.0 | 46.0 |
| $GeO_2$ | 0 | 4.0 | 3.0 | 3.0 | 3.0 | 5.0 | 5.0 |
| $B_2O_3$ | 29.0 | 19.0 | 19.0 | 19.0 | 19.0 | 19.0 | 19.0 |
| $Ga_2O_3$ | 0 | 5.0 | 5.0 | 5.0 | 5.0 | 6.0 | 6.0 |
| $Bi_2O_3$ | 0 | 0 | 5.0 | 5.0 | 5.0 | 4.0 | 3.0 |
| ZnO | 15.0 | 15.0 | 15.0 | 15.0 | 15.0 | 15.0 | 15.0 |
| $Y_2O_3$ | 2.0 | 0.5 | 0.5 | 0.5 | 0.5 | 0.5 | 0.5 |
| $La_2O_3$ | 2.0 | 0.5 | 0.5 | 0.5 | 0.5 | 0.5 | 0.5 |
| $Gd_2O_3$ | 1.0 | 3.0 | 3.0 | 3.0 | 3.0 | 3.0 | 3.0 |
| $Ta_2O_5$ | 0 | 2.0 | 2.0 | 2.0 | 2.0 | 2.0 | 2.0 |
| $TiO_2$ | 0 | 0 | 0 | 0.2 | 1.0 | 0 | 0 |
| $Na_2O$ | 0 | 0 | 0 | 0 | 0 | 0 | 0 |
| $T_G$ | 420 | 430 | 430 | 430 | 435 | 440 | 440 |

TABLE 1-continued

|     | 1     | 2     | 3     | 4     | 5     | 6     | 7     |
|-----|-------|-------|-------|-------|-------|-------|-------|
| T   | 99    | 99    | 96.7  | 95.9  | 91.3  | 98.4  | 99.0  |
| L   | 9.4   | 6.0   | 12.1  | 12.2  | 4.1   | 12.0  | 10.0  |
| n   | 1.948 | 1.972 | 2.034 | 2.034 | 2.038 | 2.008 | 1.997 |
| $n_d$ | 1.886 | 1.909 | 1.958 | 1.958 | 1.961 | 1.937 | 1.928 |
| $v_d$ | 26.9 | 26.4  | 23.8  | 23.9  | 23.7  | 24.8  | 25.3  |
| RW  | 1     |       |       |       |       |       |       |
| RA  | 2     |       |       |       |       |       |       |

TABLE 2

|         | 8     | 9     | 10    | 11    | 12    | 13    | 14    | 15    |
|---------|-------|-------|-------|-------|-------|-------|-------|-------|
| $TeO_2$ | 47.0  | 45.2  | 45.0  | 44.8  | 44.6  | 45.0  | 45.0  | 54.0  |
| $GeO_2$ | 5.0   | 5.0   | 5.0   | 5.0   | 5.0   | 5.0   | 3.0   | 5.0   |
| $B_2O_3$ | 19.0 | 19.0  | 19.0  | 19.0  | 19.0  | 18.0  | 19.0  | 0     |
| $Ga_2O_3$ | 6.0 | 6.0   | 6.0   | 6.0   | 6.0   | 6.0   | 5.0   | 0     |
| $Bi_2O_3$ | 2.0 | 3.0   | 3.0   | 3.0   | 3.0   | 3.0   | 3.0   | 0     |
| ZnO     | 15.0  | 15.0  | 15.0  | 15.0  | 15.0  | 15.0  | 15.0  | 30.0  |
| $Y_2O_3$ | 0.5  | 0.5   | 0.5   | 0.5   | 0.5   | 0.5   | 0.5   | 3.0   |
| $La_2O_3$ | 0.5 | 0.5   | 0.5   | 0.5   | 0.5   | 0.5   | 0.5   | 0     |
| $Gd_2O_3$ | 3.0 | 3.0   | 3.0   | 3.0   | 3.0   | 3.0   | 3.0   | 0     |
| $Ta_2O_5$ | 2.0 | 2.0   | 2.0   | 2.0   | 2.0   | 3.0   | 2.0   | 0     |
| $TiO_2$ | 0     | 0.8   | 1.0   | 1.2   | 1.4   | 1.0   | 2.0   | 0     |
| $Na_2O$ | 0     | 0     | 0     | 0     | 0     | 0     | 0     | 8.0   |
| $T_G$   | 440   | 440   | 440   | 440   | 450   | 445   | 445   | 335   |
| T       | 98.7  | 94.2  | 94.9  | 93.6  | 93.0  | 95.2  | 86.6  | 98.0  |
| L       | 9.5   | 2.5   | 1.9   | 1.6   | 1.6   | 1.9   | 2.4   | 10.8  |
| n       | 1.986 | 2.001 | 2.001 | 2.001 | 2.002 | 2.011 | 2.041 | 2.01  |
| $n_d$   | 1.920 | 1.931 | 1.932 | 1.930 | 1.931 | 1.940 | 1.963 |       |
| $v_d$   | 25.7  | 25.1  | 25.1  | 25.3  | 25.3  | 24.8  | 23.5  |       |
| RW      |       |       | 1     |       |       | 1     |       | 3     |
| RA      |       |       | 1     |       |       | 1     |       | 3     |

INDUSTRIAL APPLICABILITY

A lens made of the optical glass of the present invention is useful for e.g. an object lens to be used for writing on or reading out from an optical recording medium such as CD, CD-R, CD-RW, DVD or MO, or for a collimate lens for a laser.

Particularly, the lens of the present invention shows little decrease in the transmitted light intensity even when irradiated with a violet laser diode light for a long time and thus is useful as an object lens for DVD which employs a violet laser diode light.

The lens of the present invention is useful for a collimate lens and an object lens, and thus is applicable to a field where interchanging use of a violet laser light and a near infrared laser light which has been used heretofore, is desired.

The entire disclosures of Japanese Patent Application No. 2004-186226 filed on Jun. 24, 2004 and Japanese Patent Application No. 2004-233408 filed on Aug. 10, 2004 including specifications, claims and summaries are incorporated herein by reference in their entireties.

What is claimed is:

1. An optical glass consisting essentially of, as represented by mol % based on the following oxides:
   from 35 to 54% of $TeO_2$;
   from 0 to 10% of $GeO_2$;
   from 5 to 30% of $B_2O_3$;
   from 0 to 15% of $Ga_2O_3$;
   from greater than 0 to 8% of $Bi_2O_3$;
   from 3 to 20% of ZnO;
   from 0 to 10% of MgO+CaO+SrO+BaO;
   from 1 to 10% of $Y_2O_3$+$La_2O_3$+$Gd_2O_3$;
   from 0 to 5% of $Ta_2O_5$+$Nb_2O_5$;
   from 0 to 1.8% of $TiO_2$; and
   from 0 to 6% of $Li_2O$+$Na_2O$+$K_2O$+$Rb_2O$+$Cs_2O$.

2. The optical glass according to claim 1, wherein $TeO_2$+$GeO_2$ is from 40 to 60 mol %.

3. The optical glass according to claim 1, which contains $TiO_2$.

4. The optical glass according to claim 1, wherein the $Bi_2O_3$ is from 2 to 8 mol %.

5. The optical glass according to claim 1, wherein $B_2O_3$+$Ga_2O_3$+$Bi_2O_3$ is from 15 to 35 mol %.

6. The optical glass according to claim 1, wherein ZnO+MgO+CaO+SrO+BaO is from 5 to 30 mol %.

7. The optical glass according to claim 1, wherein an internal transmittance in a thickness of 1 mm to a light with a wavelength of 405 nm being is at least 90% and a refractive index to the same light is at least 1.92.

8. The optical glass according to claim 1, wherein a decrease, L, in the intensity of light transmitted in a thickness of 1 mm in 24 hours after the irradiation, when irradiated with a light with a wavelength of 405 nm under such a condition that the energy density is 6 kW/m$^2$, is not more than 16%.

9. The optical glass according to claim 1, which can be melted at a temperature of not higher than 980° C.

10. A lens comprising the optical glass as defined in claim 1.

11. The optical glass according to claim 3, wherein the $TiO_2$ is from 0.3 to 1.8 mol %.

12. The optical glass according to claim 1, wherein the mol % $Fe_2O_3$ is at most 0.0001%.

* * * * *